July 18, 1933.   G. A. KNAAK   1,918,340
FLUID PRESSURE REGULATOR
Filed Sept. 13, 1929   3 Sheets-Sheet 1

Inventor:
George A. Knaak.

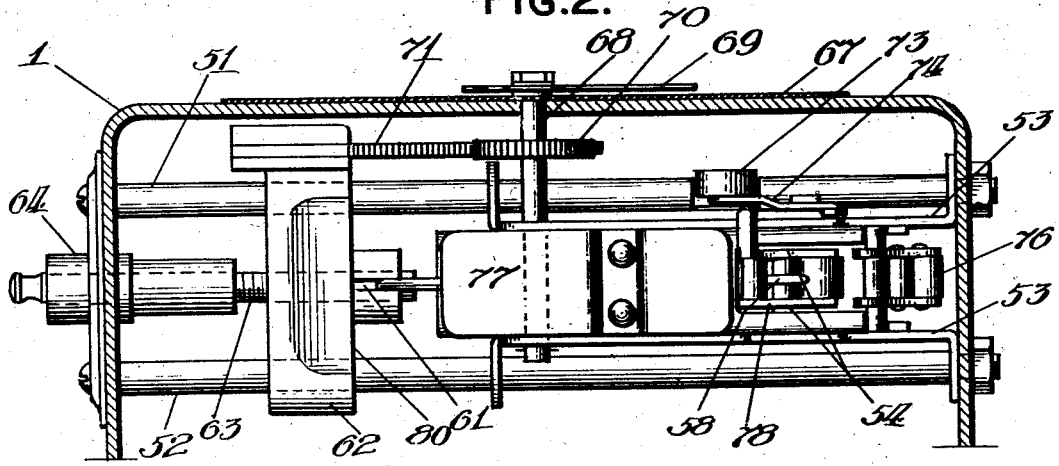
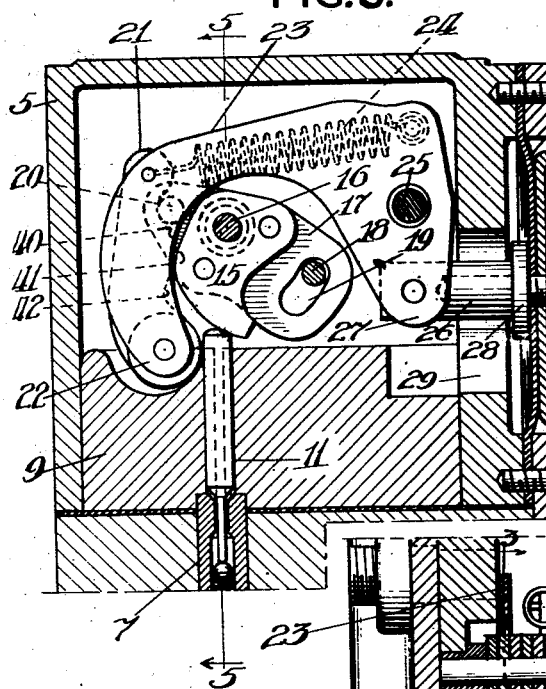

Patented July 18, 1933

1,918,340

UNITED STATES PATENT OFFICE

GEORGE A. KNAAK, OF MILWAUKEE, WISCONSIN

FLUID PRESSURE REGULATOR

Application filed September 13, 1929. Serial No. 392,334.

This invention relates to a fluid pressure regulator.

The regulator to which the invention applies in particular is adapted to control the delivery of fluid under pressure to a receiver and to limit the ultimate pressure therein.

One of the important applications of my invention is its use for automatically inflating tires, in which the user adjusts said apparatus to the pressure desired, and upon connection to the tire, the said tire will be automatically filled with the pressure fluid to said adjusted pressure limit.

Apparatuses for inflating tires as now commonly in use are designed on the well-known principle of pressure regulation. They deliver air directly from a high pressure source to the tire and have interposed between the supply tank and the tire, means for controlling the high pressure air stream through the medium of a single valve. This valve is retarded in its movement to the closing position to provide an interval of time in which air may flow directly into the tire at the pressure of the supply source.

In the said apparatuses now commonly in use, the controlling means employed requires a definite pressure to shut off the valve. Should this pressure be below the required extremity, and an attempt made to use the apparatus under this condition—control of the valve is entirely lost—allowing the high pressure of the supply to flow directly into the tire, irrespective of the adjustment made to limit the pressure to be delivered to the tire.

Furthermore, in apparatuses now commonly in use, should the user not hold the tire chuck firmly to the tire valve, considerable air will be vented to the atmosphere, while the balance of the discharged air will enter the tire. Under this condition, pressure to the valve controlling member will not build up during the timed interval to shut off the valve—resulting in excessive charges delivered to the tire, with possible serious over-inflation.

The primary object of my invention is to provide apparatus that will reliably and safely deliver air to a tire at a pressure less than that of the major supply source—in definitely measured quantity charges—without the risk of dangerous over-inflation, whereby the disadvantages pointed out with respect to apparatus of this type now commonly in use are overcome.

With the foregoing primary object, and other objects, in view, the invention consists of the devices and elements hereinafter more fully described, and the equivalents thereof.

A pressure regulator embodying the invention has a measuring reservoir to be connected to a source of fluid under pressure and to a receiver, mechanism for controlling the flow of fluid to the measuring reservoir and from the measuring reservoir to the receiver, and means for adjusting the control mechanism to limit the ultimate pressure in the receiver.

The control mechanism has a control housing, an inlet valve between the control housing and the source of fluid under pressure, an outlet valve between the control housing and the receiver, and pressure responsive mechanism to operate these valves.

A regulating valve, opened automatically by the pressure of the fluid, may be interposed between the control housing and the measuring reservoir.

This valve is adapted to operate at a pressure intermediate the pressure of the fluid delivered to the regulator and the pressure desired in the receiver.

The pressure responsive mechanism is spring biased to close the outlet valve and open the inlet valve to permit fluid under pressure to fill the measuring reservoir.

When the pressure in the measuring reservoir reaches a predetermined maximum, the pressure responsive mechanism is operated thereby to close the inlet valve and open the outlet valve and permit the fluid in the measuring reservoir to flow to the receiver until the pressure in the measuring reservoir has been reduced sufficiently to permit the regulating valve to close.

A measured charge of high pressure fluid is thus delivered to the receiver during each cycle of operation.

As soon as the pressure in the control mechanism has dropped below a predetermined pressure, which is the maximum pressure desired in the receiver, the pressure responsive mechanism is spring operated to close the outlet valve and open the inlet valve and start a second cycle of operation.

When a sufficient number of measured charges of fluid under pressure have been delivered to the receiver to produce the desired pressure therein, the pressure in the control mechanism is too great for the spring to overcome and the regulator ceases to function.

The control mechanism may be so adjusted that both the inlet and outlet valves are held open simultaneously to permit fluid to flow continuously through the control chamber to the receiver.

While the invention is adaptable to other uses, it is primarily intended for regulating the flow of compressed air to pneumatic tires and is herein illustrated and described as applied to apparatus for that purpose.

Apparatus embodying the invention is shown in the accompanying drawings in which the views are as follows:

Fig. 2 is a sectional plan on the line 2—2 of Fig. 1, certain parts being omitted.

Fig. 3 is a longitudinal section through the control housing, taken on the line 3—3 of Fig. 5.

Fig. 4 is a longitudinal section through the control housing, taken on the line 4—4 of Fig. 5.

Fig. 5 is a transverse section through the control housing, taken on the line 5—5 of Fig. 3.

Figure 1:
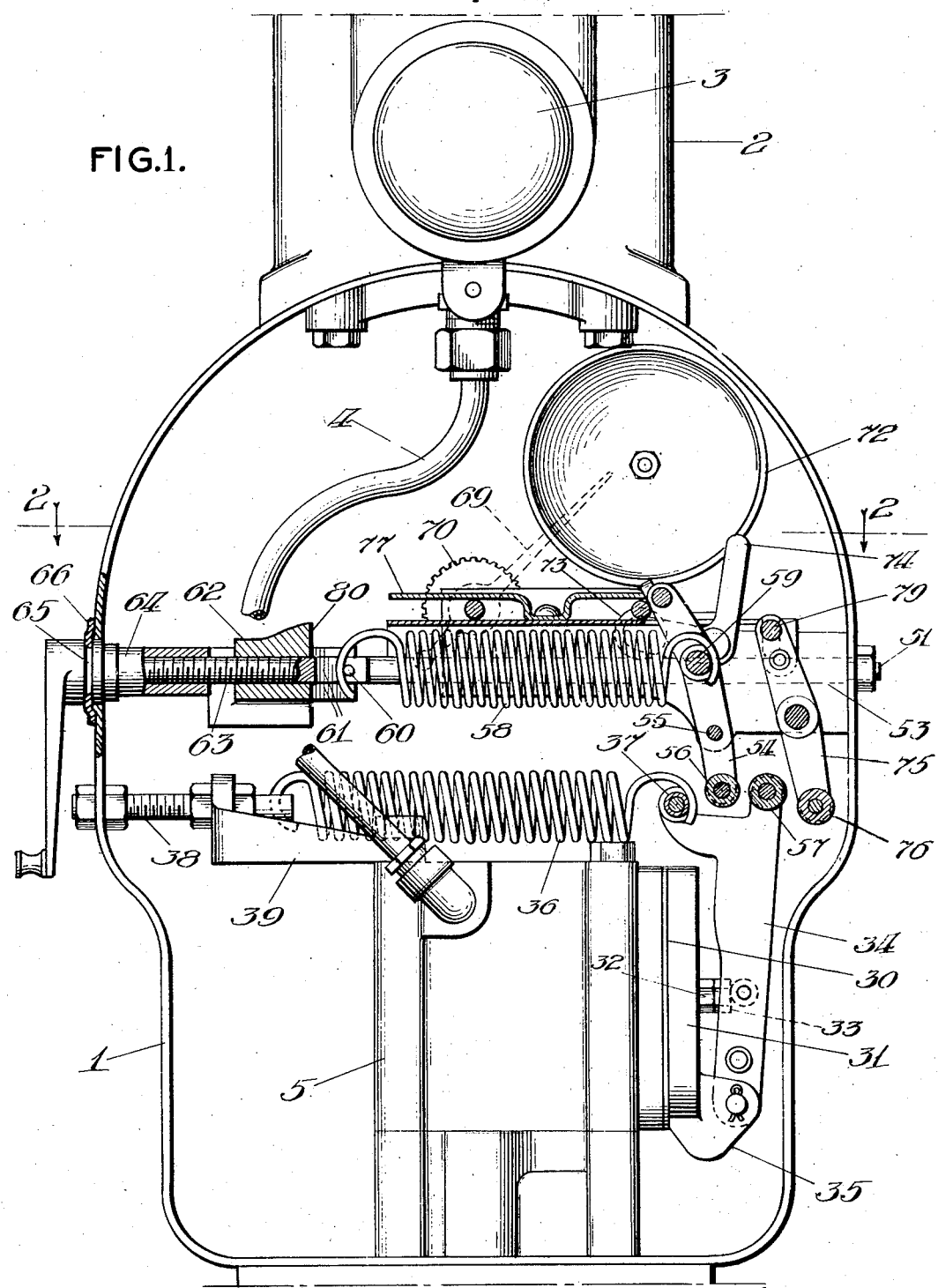
Fig. 1 is a rear elevation, partly in section, of a pressure regulator.
Figure 6:
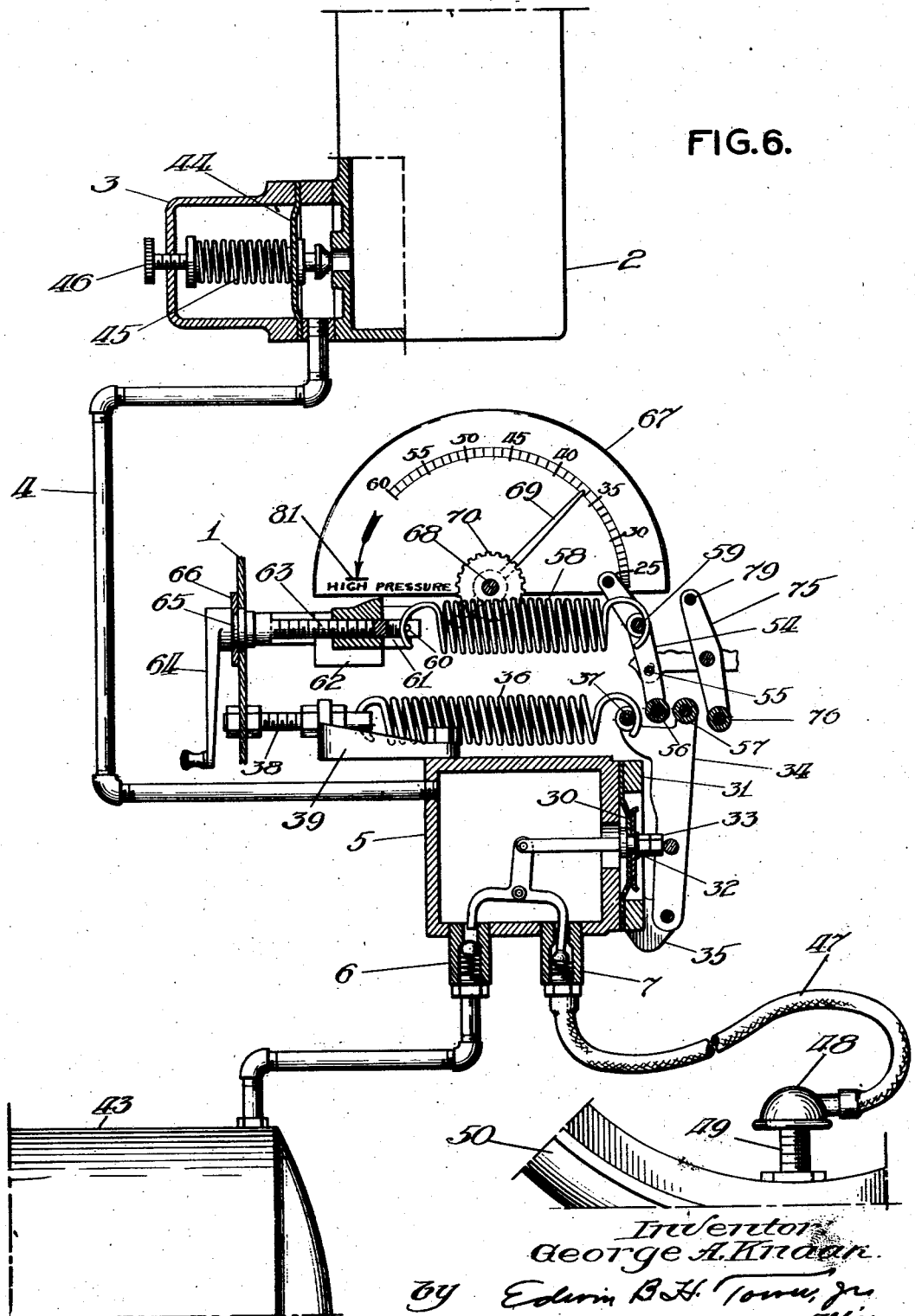
Fig. 6 is a schematic drawing showing the operation of the apparatus, the valve-actuating mechanism in fact being of the type illustrated in Figs. 3, 4 and 5.

The regulator has a casing 1 upon which a measuring reservoir 2 is arranged and provided with a regulating valve 3 which is connected by a pipe 4 to a control housing 5.

The control housing 5 is provided with a self-closing inlet valve 6 and a similar outlet valve 7.

Supports 8 and 9 are arranged in the control housing 5 and provided with ports 10 and 11, respectively, in alinement with the valves 6 and 7.

A valve stem 12 is arranged in and guided by the port 10 to open the inlet valve 6 and a stem 13 is arranged in and guided by the port 11 to open the outlet valve 7.

The valve stems 12 and 13 are operated, respectively, by cams 14 and 15 which are carried by a shaft 16 journalled in the supports 8 and 9.

The shaft 16 also carries cam arms 17 which are fixed for oscillation with the cams 14 and 15.

A stop pin 18 is carried by the supports 8 and 9 and engages slots 19 in the cam arms 17 to limit the movement thereof and, consequently, the movement of the cams 14 and 15 in either direction.

The cam arms 17 are provided with a cam face or roller 20 to engage cam faces on a cam lever 21.

The cam lever 21 has the lower end thereof pivoted between the inner ends 22 of a pair of levers 23 and is urged against the cam roller 20 by a spring 24 attached to its upper end and to the levers 23.

The levers 23 are arranged upon a shaft 25 carried by the supports 8 and 9.

A plunger 26 has one end pivoted between the outer ends 27 of the levers 23 and its other end internally threaded to receive a shouldered stud 28.

The plunger 26 and the stud 28 are reciprocable in an opening 29 which is formed in the wall of the control housing 5.

The opening 29 is closed by a diaphragm 30 which is held in place by a ring 31.

The stud 28 extends through the diaphragm 30 and is provided with a nut 32 and a lock nut 33 which secures the diaphragm firmly on the stud.

An operating lever 34 is pivoted between a pair of lugs 35 on the ring 31 and urged against the lock nut 33 by an operating spring 36.

The spring 36 has one end connected to the operating lever 34 by a pin 37 and the other end connected to an adjusting screw 38 which may be locked in adjusted positions to a yoke 39 attached to the control housing 5.

The function of the spring 36, and allied mechanism, is to impose a fixed load upon the lever 34 in opposition to the pressure exerted upon the lever by the fluid under pressure within the dispensing reservoir.

The adjusting screw 38 may also be secured to the side wall of the casing 1 to relieve the strain of the spring 36 on the control housing 5.

The spring 36 urges the operating lever 34 against the lock nut 33 to move the plunger 26 and the forward end 27 of the levers 23 inwardly, causing the inner end 22 of the levers 23 and the cam lever 21 to move upwardly.

As the cam lever 21 moves upwardly, the cam face 40 thereon moves along the cam roller 20 against the action of the spring 24 until the high point 41 on cam lever 21 passes the roller 20.

The spring 24 then causes the cam roller 20 to move suddenly along the cam face 42 on the cam lever 21, thus rotating the cam arms 17 and the cams 14 and 15 about the axis of the shaft 16 to open the inlet valve 6 and close the outlet valve 7.

Compressed air from a suitable source, such as the tank 43, may now flow through the inlet valve 6, the control housing 5 and the pipe 4 to the regulating valve 3.

When the pressure in the regulating valve 3 reaches a predetermined maximum, the diaphragm 44 is distended against the action of a spring 45, the valve opened and the measuring reservoir 2 filled with compressed air.

The pressure at which the regulating valve will operate may be adjusted by a screw 46 which controls the tension of the spring 45.

As soon as the pressure upon the diaphragm 30 is sufficient to overcome the resistance of the spring 36, the diaphragm 30 will move the plunger 26 outwardly and operate the cam and lever mechanism to open the outlet valve 7 and close the inlet valve 6, as shown in the drawings.

An air hose 47, connected to the outlet valve 7, has a valve chuck 48 upon its free end which may be connected to the valve stem 49 of a pneumatic tire 50.

The compressed air stored in the measuring reservoir 2 may now flow to the tire 50 until the pressure of the air upon the diaphragm 44 is insufficient to resist the action of the spring 45 which closes the regulator valve to trap the compressed air remaining in the measuring reservoir 2.

A measured charge of compressed air is thus delivered to the tire 50 at high pressure as only a negligible amount of air is contained in the pipe 4 and the control housing 5 which is substantially filled by the cam and lever mechanism and the supports 8 and 9.

When the pressure in the control housing 5 falls below the pressure desired in the tire, the spring 36 overcomes the pressure upon the diaphragm 30 and starts a second cycle of operation.

The pressure created in the tire 50 may be limited by regulating mechanism which is carried by two rods 51 and 52 arranged transversely of the casing 1.

The regulating mechanism has a frame 53 which is carried by the rods 51 and 52 and secured at one end thereby to the side wall of the casing 1.

A regulating lever 54 is pivoted between the side walls of the frame 53 upon a pin 55 and provided at the lower end thereof with a roller 56 to be engaged by a roller 57 carried by the operating lever 34.

The upper end of the lever 54 is urged against a part of the stationary frame 53 by a regulating spring 58 which has one end thereof connected to a pin 59 which is arranged intermediate the pin 55 and the upper end of the lever 54.

The other end of the spring 58 is secured by a pin 60 in a slot 61 which is formed in a support 62 and in an adjusting screw 63.

The support 62 is carried by the rods 51 and 52 and adapted to slide thereon.

The adjusting screw 63 is fixed in the support 62 and held against rotation therein by the pin 60.

A crank 64 is threaded on the adjusting screw 63 and provided with an annular groove 65 to receive a plate 66 which is secured to the casing 1 and holds the crank against axial movement.

The initial tension of the spring 58 may be varied by rotating the crank 64 to move the support 62 along the rods 51 and 52.

The springs 36 and 58 are calibrated in respect to each other and to the leverage of the operating lever 34 relatively to the area of the diaphragm 30.

The action of the operating spring 36 is opposed by the action of the regulating spring 58 so that the ultimate pressure in the tire 50 is inversely proportional to the tension of the spring 58.

A dial 67 is arranged upon the front of the casing 1 and provided with graduations to indicate the approximate air pressures which may be obtained in the tire 50 but which cannot be exceeded therein.

A shaft 68 is journalled in the frame 53 and carries a pointer 69 to indicate upon dial 67 the graduation representing the pressure to be obtained in the tire 50.

A gear 70 is fixed on the shaft 68 and meshes with a rack 71 which is carried by the support 62.

As the crank 64 is rotated to move the support 62 and vary the tension of the spring 58, the pointer 69 will move around the dial 67 and indicate pressures corresponding to the tension of the spring 58.

A bell 72 is arranged on the inside of the casing 1 and adapted to be struck by a hammer 73 each time a charge of compressed air is delivered by the apparatus.

The hammer 73 is carried by the horizontal arm of a bell crank 74 which is pivoted on the frame 53.

The vertical arm of the bell crank 74 is engaged by a lug on the upper end of the regulating lever 54 and the hammer 73 brought against the bell 72 to ring the same each time that the spring 36 overcomes the pressure on the diaphragm 30 and the cam roller 20 moves to the low point of the cam face 42 on the cam lever 21.

The regulating mechanism also has a lever 75 pivoted to the frame 53 and provided at its lower end with a roller 76 to engage the roller 57 and hold the operating lever in an intermediate position against the pressure upon the diaphragm 30 so that both the inlet and the outlet valves will remain open and permit a continuous flow of high pressure air for inflating large truck tires or for other purposes.

The roller 76 is moved against the roller 57 by a movable frame 77 which is carried by the stationary frame 53 and adapted to slide therein.

The horizontal web of the frame 77 is provided with a slot 78 to accommodate the upper ends of the levers 54 and 75 and with vertical slots in the side walls thereof to receive a pin 79 carried by the upper end of the lever 75.

The support 62 has an abutment 80 to engage the end of the frame 77 and move the same in the frame 53 as the crank 64 is rotated to move the support 62 along the rods 51 and 52.

When the frame 77 has been moved sufficiently to cause the roller 76 to hold the operating lever 34 in an intermediate position, the pointer 69 will have moved to a graduation 81 on the dial 67 which indicates that both the outlet and the inlet valves are open.

The tension of the spring 24 and the pitch of the cam faces 40 and 42, relatively to the leverage of the cam arms 17, are such that considerable pressure is required to actuate the cam and lever mechanism and operate the inlet and outlet valves.

Assuming that the parts of the apparatus are in the positions shown in the drawings, that the regulating valve 3 is adjusted to operate at 100 pounds pressure, and that the air in the tank 43 has a pressure in excess of 120 pounds, the apparatus will function as follows:

The valve chuck 48 is pressed upon the valve stem 49 to open the valves therein and permit air to flow from the measuring reservoir 2, through the pipe 4, the control housing 5, the outlet valve 7, and the hose 47 to the tire 50.

When the pressure in the measuring reservoir 2 falls below 100 pounds, the regulating valve 3 will close and trap the air remaining therein so that only a very small amount of air in the pipe 4, control housing 5, and hose 47 is delivered to the tire at a pressure below 100 pounds. Consequently, the apparatus operates rapidly and quickly inflates a tire to the desired pressure.

As the pressure in the control housing 5 falls, the spring 36 moves the operating lever 34 inwardly against the pressure upon the diaphragm 30.

But when the roller 57 engages the roller 56, the spring 36 is opposed by the spring 58 so that inward movement of the lever 34 is retarded until the pressure in the control housing 5 has fallen slightly below the pressure indicated by the pointer 69.

The operating spring 36 is then able to overcome the combined effect of the pressure upon the diaphragm 30 and the resistance of the spring 58 and complete the movement of the lever 34 and operate the cam and lever mechanism in the control housing 5 to close the outlet valve 7 and open the inlet valve 6.

Air at high pressure will now flow from the tank 43 through the control housing 5 and the pipe 4 to the regulating valve 3 which will open as soon as the pressure upon the diaphragm 44 reaches 100 pounds and permit the high pressure air to fill the measuring reservoir 2.

As soon as the pressure in the control housing 5 reaches 120 pounds, the pressure upon the diaphragm 30 overcomes the resistance of the spring 36 and the cam and lever mechanism is operated to close the inlet valve 6 and open the outlet valve 7 and deliver a second charge of high pressure air to the tire 50.

Successive charges of high pressure air are thus delivered to the tire 50 until the desired pressure has been obtained therein and each time that the inlet valve is opened to admit air from the tank 43, the hammer 73 strikes the bell 72 to indicate that the delivery of a charge of air to the tire has been completed.

When the desired pressure has been obtained in the tire 50, the same pressure will prevail in the control housing 5 and this pressure is greater than the spring 36 can overcome so that the apparatus ceases to function.

If a pressure is desired in the tire 50 which is beyond the capacity of the regulating mechanism, or if a continuous flow of high pressure air is desired, the crank 64 is rotated until the pointer 69 coincides with the graduation 81.

As soon as the valve in the valve chuck 48 is opened, if the pressure in the housing 5 is below a predetermined amount, the spring 36 will open the inlet valve 6 to admit high pressure air which acts upon the diaphragm 30 to open the outlet valve 7.

However, the roller 76 is so positioned by the regulating apparatus that the same prevents the operating lever 34 from moving beyond an intermediate position so that the inlet valve 6 cannot be closed and continuous pressure upon the diaphragm 30 holds the outlet valve 7 open.

The invention herein set forth is susceptible of various modifications and adaptions without departing from the scope thereof as hereafter claimed.

For instance, while the foregoing specification refers specifically to the reservoir 2 as a measuring reservoir and the chamber 5 as a controlling housing, yet the invention in its broadest aspect, as indicated in appended claims, is not to be restricted to the reservoir 2 acting solely as the measuring reservoir, and the chamber 5 as a housing for the controlling mechanism. While under the particular showing in this application, the reservoir 2 first measures the fluid in the manner hereinbefore fully pointed out, yet the housing 5 for the controlling mechanism also acts in conjunction with the reservoir 2 in dispensing or discharging the fluid, after the quantity of fluid admitted into the reservoir 2 reaches a predetermined pressure lower than the pressure in the supply source. Therefore, in the broader aspect of the invention, both the reservoir 2 and control housing 5 may be comprehended under the generic title of "dispensing mechanism for dispensing a measured quantity of the fluid after said fluid admitted from the supply source has created a definite predetermined pressure lower than the supply pressure". In other words, the invention is not necessarily limited to the two casings 2 and 5.

From the foregoing description it will be seen that in the principle employed in my invention, air is relayed from high pressure storage tank to the tire in two successive stages, through an intermediary reservoir. This reservoir has a supply valve connected by suitable piping to the high pressure supply storage, a delivery valve arranged for connection to the tire or to any other receiver to be filled through a tube or hose, and means are supplied for filling said reservoir by opening the supply valve at predetermined pressures, and closing said supply valve when a definite pressure limit has been reached in said reservoir—closing of said supply valve cutting off communication between the reservoir and the high pressure supply storage.

As the supply valve closes, the mechanism simultaneously opens the delivery valve to allow air to flow from said reservoir to the tire or other receiver. When a predetermined reduction of pressure in said reservoir has been effected, the delivery valve closes and the mechanism simultaneously opens the supply valve, again filling the reservoir.

The opening and closing of said valves are alternately repeated in direct response to predetermined pressure differentials until a definite pressure limit obtains in the tire to sustain the supply valve in its closed position. It follows that no charge delivered to the tire can be greater than the definitely measured quantity in the reservoir.

It will also be noted that the high pressure suppy storage serves as the supply source for filling the reservoir only, while said reservoir serves as the sole supply for filling the tire, said reservoir with cooperating elements being an independent delivery agent.

Since the supply valve and the delivery valve are simultaneously operated, one or the other shuts off all direct communication between the high pressure reserve storage and the tire.

Should the pressure, however, of the supply storage be below that required to operate the control member, the apparatus cannot function—protecting the tire from the high pressure of the supply storage.

In my invention the pressure responsive means, i. e. the diaphragm is directly responsive to pressures obtaining in said reservoir.

In apparatus commonly in use, the primary control member is restrained with respect to ambient pressures, delaying the movement of the valve to its closing position, thus providing an interval of time in which air may flow into the tire directly from the high pressure supply source—the timing provision being a dominating factor in the operation of such apparatus.

In my invention each charge is definitely measured as to quantity, by the content of the reservoir. In apparatus now commonly in use, the quantity of each charge varies and is dependent on the pressure of the supply source, the pressure obtaining in the tire and the span of the interval of time provided for the flow of air from the supply source to the tire.

The invention is claimed as follows:

1. A pressure regulator comprising a control housing having an inlet valve for connection to a source of fluid under pressure and an outlet valve for connection to a receiver, a measuring reservoir communicating with said control housing, and means responsive to a predetermined high fluid pressure in said housing to open said outlet valve and close said inlet valve and responsive to a predetermined minimum fluid pressure in said housing to close said outlet valve and open said inlet valve.

2. A pressure regulator comprising a control housing having an inlet valve for connection to a source of fluid under pressure and an outlet valve for connection to a receiver, a measuring reservoir communicating with said control housing, means responsive to a predetermined high fluid pressure in said housing to open said outlet valve and close said inlet valve and responsive to a predetermined minimum fluid pressure in said housing to close said outlet valve and open said inlet valve, and means to regulate said predetermined minimum fluid pressure.

3. A pressure regulator comprising a control housing having an inlet valve for connection to a source of fluid under pressure and an outlet valve for connection to a receiver, a measuring reservoir communicating with said control housing, means responsive to a predetermined high fluid pressure in said housing to open said outlet valve and close said inlet valve and responsive to a predetermined minimum fluid pressure in said housing to close said outlet valve and open said inlet valve, and an automatic valve arranged between said housing and said reservoir and adapted to operate at a pressure intermediate said high pressure and said minimum pressure.

4. A pressure regulator comprising a control housing having an inlet valve for connection to a source of fluid under pressure and an outlet valve for connection to a receiver, a measuring reservoir communicating with said control housing, means responsive to a predetermined high fluid pressure in said housing to open said outlet valve and close said inlet valve and responsive to a predetermined minimum fluid pressure in said housing to close said outlet valve and open said inlet valve, means to regulate said predetermined minimum fluid pressure, and an automatic valve arranged between said housing and said reservoir and adapted to operate at a pressure intermediate said high pressure and said minimum pressure.

5. A pressure regulator comprising a control housing having an inlet valve for connection to a source of fluid under pressure and an outlet valve for connection to a receiver, a measuring reservoir communicating with said control housing, means responsive to a predetermined high fluid pressure in said housing to open said outlet valve and close said inlet valve and responsive to a predetermined minimum fluid pressure in said housing to close said outlet valve and open said inlet valve, and means to adjust said pressure responsive means to permit both of said valves to remain open simultaneously.

6. A pressure regulator comprising a control housing having an inlet valve for connection to a source of fluid under pressure and an outlet valve for connection to a receiver, a measuring reservoir communicating with said control housing, means responsive to a predetermined high fluid pressure in said housing to open said outlet valve and close said inlet valve and responsive to a predetermined minimum fluid pressure in said housing to close said outlet valve and open said inlet valve, means to regulate said predetermined minimum fluid pressure, and means associated with said pressure regulating means to cause both of said valves to remain open simultaneously.

7. A pressure regulator comprising a control housing having an inlet valve for connection to a source of fluid under pressure and an outlet valve for connection to a receiver, mechanism responsive to a predetermined high fluid pressure in said control housing to close said inlet valve and open said outlet valve, a spring to operate said mechanism against a predetermined minimum pressure in said control housing and open said inlet valve and close said outlet valve, a regulating spring opposing said operating spring, and means to vary the tension of said regulating spring.

8. A pressure regulator comprising a control housing having an inlet valve for connection to a source of fluid under pressure and an outlet valve for connection to a receiver, a measuring reservoir communicating with said control housing, mechanism responsive to a predetermined high fluid pressure in said control housing to close said inlet valve and open said outlet valve, a spring to operate said mechanism against a predetermined minimum pressure in said control housing and open said inlet valve and close said outlet valve, a regulating spring opposing said operating spring, and means to vary the tension of said regulating spring.

9. A pressure regulator comprising a control housing having an inlet valve for connection to a source of fluid under pressure and an outlet valve for connection to a receiver, a measuring reservoir communicating with said control housing, mechanism responsive to a predetermined high fluid pressure in said control housing to close said inlet valve and open said outlet valve, a spring to operate said mechanism against a predetermined minimum pressure in said control housing and open said inlet valve and close said outlet valve, a regulating spring opposing said operating spring, means to vary the tension of said regulating spring, and an automatic valve arranged between said housing and said reservoir and adapted to operate at a pressure intermediate said high and minimum pressures.

10. A pressure regulator comprising a control housing having an inlet valve for connection to a source of fluid under pressure and an outlet valve for connection to a receiver, a diaphragm carried by said housing and responsive to the fluid pressure therein, mechanism for operating said valves connected to said diaphragm and actuated thereby, an operating lever arranged upon said housing to operate said mechanism, an operating spring to control said lever, a regulating lever to engage said operating lever, a spring controlling said regulating lever to limit the ultimate pressure created in said receiver, and means to vary the tension of said regulating spring.

11. A pressure regulator comprising a control housing having an inlet valve for connection to a source of fluid under pressure and an outlet valve for connection to a receiver, a diaphragm carried by said housing and responsive to the fluid pressure therein, mechanism for operating said valves connected to said diaphragm and actuated thereby, an operating lever arranged upon said housing to operate said mechanism, an operating spring to control said lever, a regulating lever to engage said operating lever, a spring controlling said regulating lever and having the tension thereof inversely proportional to the pressure to be created in said receiver, and means to vary the tension of said regulating spring.

12. A pressure regulator comprising a control housing having an inlet valve for connection to a source of fluid under pressure and an outlet valve for connection to a receiver, a measuring reservoir communicating with said control housing, a diaphragm carried by said control housing and responsive to a predetermined high fluid pressure therein, mechanism for operating said valves connected to said diaphragm and actuated thereby, an operating lever arranged upon said housing to operate said mechanism, an operating spring to operate said lever against a predetermined minimum fluid pressure in said control housing, a regulating lever to engage said operating lever, a spring controlling said regulating lever to limit the ultimate pressure created in said receiver, and means to vary the tension of said regulating spring.

13. A pressure regulator comprising a control housing having an inlet valve for connection to a source of fluid under pressure and an outlet valve for connection to a receiver, a measuring reservoir communicating with said control housing, a diaphragm carried by said control housing and responsive to a predetermined high fluid pressure therein, mechanism for operating said valves connected to said diaphragm and actuated thereby, an operating lever arranged upon said housing to operate said mechanism, an operating spring to operate said lever against a predetermined minimum fluid pressure in said control housing, a regulating lever to engage said operating lever, a spring controlling said regulating lever to limit the ultimate pressure created in said receiver, means to vary the tension of said regulating spring, and an automatic valve arranged between said housing and said reservoir and adapted to operate at a pressure intermediate said high pressure and said minimum pressure.

14. A pressure regulator comprising a control housing having an inlet valve for connection to a source of fluid under pressure and an outlet valve for connection to a receiver, a diaphragm carried by said control housing and responsive to a predetermined high fluid pressure therein, mechanism for operating said valves connected to said diaphragm and actuated thereby, an operating lever arranged upon said housing to operate said mechanism, an operating spring to operate said lever against a predetermined minimum fluid pressure in said control housing, means to hold said operating lever in an intermediate position and permit said valve operating mechanism to hold both of said valves open, and means to bring the aforesaid means into operation.

15. A pressure regulator comprising a control housing having an inlet valve for connection to a source of fluid under pressure and an outlet valve for connection to a receiver, a diaphragm carried by said control housing and responsive to a predetermined high fluid pressure therein, mechanism for operating said valves connected to said diaphragm and actuated thereby, an operating lever arranged upon said housing to operate said mechanism, an operating spring to operate said lever against a predetermined minimum fluid pressure in said control housing, a limiting lever to engage said operating lever and hold the same in an intermediate position against the pressure of the fluid in said housing and permit said valve operating mechanism to hold both of said valves open, and means to move said limiting lever into engagement with said operating lever.

16. A pressure regulator comprising a control housing having an opening in one wall thereof and elongated inlet and outlet ports, an inlet valve communicating with said inlet port and adapted to be connected to a source of fluid under pressure, an outlet valve communicating with said outlet port and adapted to be connected to a receiver, valve stems arranged in and guided by said ports to operate said valves, mechanism arranged in said housing to operate said valve stems, a diaphragm closing said opening and responsive to a high fluid pressure in said housing to actuate said mechanism and close said inlet valve and open said outlet valve, an operating lever pivoted to said control housing and connected to said mechanism to actuate the same and open said inlet valve and close said outlet valve, and a spring to operate said lever against a predetermined minimum fluid pressure in said housing.

17. A pressure regulator comprising a control housing having an opening in one wall thereof and elongated inlet and outlet ports, a self-closing inlet valve communicating with said inlet port and adapted to be connected to a source of fluid under pressure, a self-closing outlet valve communicating with said outlet port and adapted to be connected to a receiver, valve stems arranged in and guided by said ports to operate said valves, cam and lever mechanism arranged in said housing to depress said valve stems and open said valves, a diaphragm closing said opening and responsive to a high fluid pressure in said housing to actuate said mechanism and close said inlet valve and open said outlet valve, an operating lever pivoted to said control housing and connected to said mechanism to actuate the same and open said inlet valve and close said outlet valve, and a spring to operate said lever against a predetermined minimum fluid pressure in said chamber.

18. A fluid meter, comprising a measuring reservoir connected between a source of high pressure fluid and a receiver, valve means to control the flow of fluid from said source to said reservoir and from said reservoir to said receiver, and valve operating mechanism responsive to a predetermined high fluid pressure in said reservoir to operate said valve means to close said reservoir to said source and open it to said receiver to allow the fluid contents of said reservoir to flow to said receiver and responsive to a predetermined minimum fluid pressure in said reservoir to operate said valve means to close said reservoir to said receiver and open it to said source to allow fluid from said source to flow into said reservoir.

19. A fluid meter, comprising a measuring reservoir connected between a source of high pressure fluid and a receiver, valve means to control the flow of fluid from said source to said reservoir and from said reservoir to said receiver, valve operating mechanism responsive to a predetermined high fluid pressure in said reservoir to operate said valve means to close said reservoir to said source and open it to said receiver to allow the fluid contents of said reservoir to flow to said receiver and responsive to a predetermined minimum fluid pressure in said reservoir to operate said valve means to close said reservoir to said receiver and open it to said source to allow fluid from said source to flow into said reservoir, and means to adjust said valve operating mechanism to vary said predetermined low pressure.

20. A fluid meter, comprising a measuring reservoir connected between a source of high pressure fluid and a receiver, valve means to control the flow of fluid from said source to said reservoir and from said reservoir to said receiver, valve operating mechanism responsive to a predetermined high fluid pressure in said reservoir to operate said valve means to close said reservoir to said source and open it to said receiver to allow the fluid contents of said reservoir to flow to said receiver and responsive to a predetermined minimum fluid pressure in said reservoir to operate said valve means to close said reservoir to said receiver and open it to said source to allow fluid from said source to flow into said reservoir, and means to adjust said valve operating mechanism to vary said predetermined high pressure.

21. A fluid meter, comprising a measuring reservoir connected between a source of high pressure fluid and a receiver, valve means to control the flow of fluid from said source to said reservoir and from said reservoir to said receiver, valve operating mechanism responsive to a predetermined high fluid pressure in said reservoir to operate said valve means to close said reservoir to said source and open it to said receiver to allow the fluid contents of said reservoir to flow to said receiver and responsive to a predetermined minimum fluid pressure in said reservoir to operate said valve means to close said reservoir to said receiver and open it to said source to allow fluid from said source to flow into said reservoir, and means to adjust said valve operating mechanism to vary said predetermined high and low pressures.

22. A fluid meter, comprising a pressure measuring reservoir having an inlet port connected to a source of fluid under pressure and an outlet port to be connected to a receiver for fluid under pressure, valve means controlling said ports, and valve operating mechanism responsive to the fluid pressure in said reservoir and operable in synchronism with variations in said pressure to operate said valve means and thereby close said inlet port and open said outlet port upon the pressure in said reservoir reaching a predetermined maximum and to close said outlet port and open said inlet port upon the pressure in said reservoir reaching a predetermined minimum and thereby alternately deliver pressure fluid from said source to said reservoir and from said reservoir to said receiver.

23. A fluid meter, comprising a pressure measuring reservoir having an inlet port connected to a source of fluid under pressure and an outlet port to be connected to a receiver for fluid under pressure, valve means controlling said ports, valve operating mechanism responsive to the fluid pressure in said reservoir and operable in synchronism with variations in said pressure to operate said valve means and thereby close said inlet port and open said outlet port upon the pressure in said reservoir reaching a predetermined maximum and to close said outlet port and open said inlet port upon the pressure in said reservoir reaching a predetermined minimum and thereby alternately deliver pressure fluid from said source to said reservoir and from said reservoir to said receiver, and means to adjust said valve operating mechanism to vary said predetermined low pressure.

24. A fluid meter, comprising a pressure measuring reservoir having an inlet port connected to a source of fluid under pressure and an outlet port to be connected to a receiver for fluid under pressure, valve means controlling said ports, valve operating mechanism responsive to the fluid pressure in said reservoir and operable in synchronism with variations in said pressure to operate said valve means and thereby close said inlet port and open said outlet port upon the pressure in said reservoir reaching a predetermined maximum and to close said outlet port and open said inlet port upon the pressure in said reservoir reaching a predetermined minimum and thereby alternately deliver pressure fluid from said source to said reservoir and then from said reservoir to said receiver, and means to adjust said valve operating mechanism to vary said predetermined high pressure.

25. A fluid meter, comprising a pressure measuring reservoir having an inlet port connected to a source of fluid pressure and an outlet port to be connected to a receiver for fluid under pressure, an outlet valve biased to close said outlet port, an inlet valve biased to close said inlet port, valve operating mechanism forming a part of said reservoir to respond in direct accordance with the pressure therein and in synchronism with variations in said pressure, and means actuated by said mechanism to open said outlet valve and close said inlet valve upon the pressure in said reservoir increasing to an upper pressure and close said outlet valve and open said inlet valve upon the pressure in said reservoir decreasing to a lower pressure and thereby alternately deliver fluid to said reservoir from said source and then discharge fluid from said reservoir to said receiver.

26. A fluid meter, comprising a pressure measuring reservoir having an inlet port connected to a source of fluid pressure and an outlet port to be connected to a receiver for fluid under pressure, an outlet valve biased to close said outlet port, an inlet valve biased to close said inlet port, valve operating mechanism forming a part of said reservoir to respond in direct accordance with the pressure therein and in synchronism with variations in said pressure, means actuated by said mechanism to open said outlet valve and close said inlet valve upon the pressure in said reservoir increasing to an upper pressure and close said outlet valve and open said inlet valve upon the pressure in said reservoir decreasing to a lower pressure and thereby alternately deliver fluid pressure to said reservoir from said source and then discharge fluid pressure from said reservoir to said receiver, and means to adjust said mechanism to respond to different upper and lower fluid pressures to open and close said outlet and inlet valves.

27. In a pressure regulator, the combination of a source of fluid pressure supply, fluid dispensing means provided with a discharge adapted when open for delivering a measured quantity of the fluid from the dispensing means to a receiver, means for bringing said fluid pressure supply into and out of communication with the fluid dispensing means, and means, when communication between said fluid pressure supply and the fluid dispensing means is established, for causing the filling of the fluid dispensing means with fluid to an extent sufficient to create a definite predetermined pressure in the said fluid dispensing means, lower than the supply pressure, and means constructed, after the fluid dispensing means has been filled sufficiently to create said definite, predetermined pressure, for closing communication between the source of supply and the fluid dispensing means and opening the discharge of the fluid dispensing means to permit the flow of the fluid from the fluid dispensing means in a definitely measured quantity charge.

28. In a pressure regulator, the combination of a source of fluid pressure supply, fluid dispensing means provided with a discharge adapted when open for delivering a measured quantity of the fluid from the dispensing means to a receiver, means for bringing said fluid pressure supply into and out of communication with the fluid dispensing means, means, when communication between said fluid pressure supply and the fluid dispensing means is established, for causing the filling of the fluid dispensing means with fluid to an extent sufficient to create a definite, predetermined pressure in the said fluid dispensing means lower than the supply pressure, means constructed, after the fluid dispensing means has been filled sufficiently to create said definite, predetermined pressure, for closing said communication between the source of supply and the fluid dispensing means, and opening the discharge from the fluid dispensing means, to thereby permit the flow of a measured quantity of the fluid from the fluid dispensing means to the receiver, until the pressure in the fluid dispensing means has been lowered to a predetermined minimum pressure by the flow of a quantity of the fluid to the receiver, the lowering of said pressure causing the stopping of flow of the fluid to the receiver, and opening communication between the source and the fluid dispensing means, whereupon the cycle of operation is caused to be repeated.

29. In a pressure regulator, the combination of a source of fluid pressure supply, a fluid dispensing means provided with a discharge adapted when open for delivering a measured quantity of the fluid to a receiver, means for filling the fluid dispensing means with fluid from the fluid pressure supply at a pressure lower than the pressure in the fluid pressure supply, means for causing a discharge of the fluid from the fluid dispensing means through the discharge opening thereof, and into the receiver in definitely measured quantity charges, said discharging means constructed to function alternately until a definite predetermined pressure, substantially lower than the supply, is reached in the receiver.

30. In a fluid regulator, the combination of a source of fluid under pressure, a fluid dispensing means provided with a discharge adapted when open to deliver a measured quantity of the fluid to a receiver, said fluid dispensing means communicable with the supply source, means for filling said fluid dispensing means with fluid from the source of supply, to a definite predetermined pressure limit, lower than the pressure of the source, means for effecting an opening of the discharge from the dispensing means and to cause the discharge of a measured quantity of the fluid from the dispensing means into the receiver, after the said predetermined pressure limit in the dispensing means is reached, and adjustable loading means operable to cause a cessation of the flow of measured quantities of the fluid through the discharge of the dispensing means to the receiver after a predetermined selected pressure has been attained in said receiver, said pressure limit being substantially lower than the pressure of the supply source.

31. In a pressure regulator, the combination of a source of fluid pressure supply, a fluid dispensing means connected to said fluid pressure supply, a conduit leading from the fluid dispensing means for discharging into a receiver, pressure responsive means operable in one way under the influence of the fluid pressure in the fluid dispensing means when communication between the supply source and fluid dispensing means is established, to admit fluid to the fluid dispensing means until the quantity admitted reaches a predetermined pressure lower than the pressure in the supply source, and operable in a reverse manner after the fluid dispensing means has been filled to said predetermined pressure, so as to cause the closing of communication between the fluid supply and the fluid dispensing means and the opening of communication between the dispensing means and the discharge conduit to thereby permit the flow of a measured quantity of the fluid from the dispensing means through the conduit and into the receiver, the pressure responsive means, when the pressure in the dispensing means has been lowered to a predetermined minimum pressure by the flow of a quantity of the fluid to the receiver, adapted to cause the closing off of the said flow of the fluid through the conduit to the receiver and the opening of communication between the source and the dispensing means, whereupon the cycle of operation is caused to be repeated.

32. In a pressure regulator, the combination of a source of fluid pressure supply, a fluid dispensing means connected to said fluid pressure supply, a conduit leading from the fluid dispensing means for discharging into a receiver, pressure responsive means operable in one way under the influence of the fluid pressure in the fluid dispensing means when communication between the supply source and the said fluid dispensing means is established, to admit fluid to the fluid dispensing means until the quantity of fluid admitted reaches a predetermined pressure lower than the pressure in the supply source, and operable in a reverse manner after the dispensing means has been filled to said predetermined pressure so as to cause the closing of communication between the fluid supply and the fluid dispensing means, and the opening of communication between the dispensing means and the discharge conduit to thereby permit the flow of a measured quantity of the fluid from the dispensing means through the conduit and into the receiver, the pressure responsive means, when the pressure in the dispensing means has been lowered to a predetermined minimum pressure by the flow of a quantity of the fluid to the receiver, adapted to cause the closing off of the said flow of the fluid through the conduit to the receiver and the opening of communication between the source and the fluid dispensing means, whereupon the cycle of operation is caused to be repeated, and means for stopping the successive charges of measured quantities of the fluid through the conduit to the receiver, after a certain predetermined ultimate pressure in the receiver, lower than the pressure in the supply source, has been reached.

33. In a pressure regulator, the combination of a source of fluid pressure supply, a fluid dispensing means, a valve-controlled conduit between the fluid supply and the dispensing means, a valve-controlled conduit leading from the dispensing means and adapted to discharge into a receiver, controlling means constructed to operate the valves simultaneously, one valve closing while the other opens, the opening of the valve controlling the conduit leading to the dispensing means admitting fluid into said dispensing means, pressure responsive means operable under the fluid pressure in said dispensing means, when the fluid admitted to said means reaches a predetermined pressure lower than the pressure in the supply source, to operate on the controlling means so as to effect a closing of the valve controlling the flow of fluid to the fluid dispensing means and the opening of the valve controlling the flow of the fluid from the dispensing means to the discharge conduit, to thereby permit the flow of a measured quantity of the fluid from the dispensing means through the conduit and into the receiver, the pressure responsive means, when the pressure in the reservoir has been lowered to a predetermined minimum pressure by the flow of a quantity of the fluid to the receiver, adapted to cause operation of the controlling means to close off the said flow of the fluid through the conduit to the receiver and open communication between the source and the fluid dispensing means, whereupon the cycle of operation is caused to be repeated.

34. In a pressure regulator, the combination of a source of fluid pressure supply, a fluid dispensing means, a valve-controlled conduit between the fluid supply and the fluid dispensing means, a valve-controlled conduit leading from the dispensing means and adapted to discharge into a receiver, controlling means constructed to operate the valves simultaneously, one valve closing while the other opens, the opening of the valve controlling the conduit leading to the dispensing means admitting fluid into said dispensing means, pressure responsive means operable under the fluid pressure in said dispensing means when the fluid admitted to said dispensing means reaches a predetermined pressure lower than the pressure in the supply source, to operate on the controlling means so as to effect a closing of the valve controlling the flow of fluid to the fluid dispensing means and the opening of the valve controlling the flow of the fluid from the dispensing means to the discharge conduit, to thereby permit the flow of a measured quantity of the fluid from the dispensing means through the conduit and into the receiver, the pressure responsive means, when the pressure in the dispensing means has been lowered to a predetermined minimum pressure by the flow of a quantity of the fluid to the receiver, adapted to cause the operation of the controlling means to close off the said flow of the fluid through the conduit to the receiver and open communication between the source and the dispensing means, whereupon the cycle of operation is caused to be repeated, and means for stopping the successive charges of measured quantities of the fluid through the conduit to the receiver, after a certain predetermined ultimate pressure in the receiver, lower than the pressure in the supply source, has been reached.

35. In combination, a fluid measuring housing interposed between a source of high pressure fluid and a receiver, an inlet valve for controlling the flow of fluid from the source to said housing, an outlet valve for controlling the flow of fluid from said housing to the receiver, and control mechanism responsive to a predetermined low pressure in said housing to close said outlet valve and open said inlet valve and responsive to a predetermined higher pressure in said housing to close said inlet valve and open said outlet valve and thereby deliver successive measured quantities of fluid at a predetermined pressure from the source through said housing to the receiver.

36. In combination, a fluid measuring housing interposed between a source of high pressure fluid and a receiver, an inlet valve for controlling the flow of fluid from the source to said housing, an outlet valve for controlling the flow of fluid from said housing to the receiver, control mechanism responsive to a predetermined low pressure in said housing to close said outlet valve and open said inlet valve and responsive to a predetermined higher pressure in said housing to close said inlet valve and open said outlet valve and thereby deliver successive measured quantities of fluid at a predetermined pressure from the source through said housing to the receiver, and adjustable means for subjecting said mechanism to a fixed load in opposition to the fluid pressure within said housing.

GEORGE A. KNAAK.